United States Patent

Schneider

[15] 3,673,578

[45] June 27, 1972

[54] METHOD OF INFORMATION STORAGE USING ELECTRO-OPTIC PROPERTIES OF COLOR CENTERS IN ALKALI HALIDE CRYSTALS

[72] Inventor: Irwin Schneider, 2402 Daphne Lane, Alexandria, Va. 22306

[22] Filed: Nov. 18, 1970

[21] Appl. No.: 90,800

[52] U.S. Cl. ..................340/173 CC, 340/173 LS, 350/160 P

[51] Int. Cl. ....................................G11c 11/42, G11c 13/04

[58] Field of Search..................340/173 R, 173 CC, 173 LS; 350/160, 160 P

[56] References Cited

UNITED STATES PATENTS

| | | | |
|---|---|---|---|
| 3,466,617 | 9/1969 | Levy | 340/173 CC |
| 3,568,167 | 3/1971 | Carson | 340/173 CC |

*Primary Examiner*—Terrell W. Fears

*Attorney*—R. S. Sciascia and Arthur L. Branning

[57] ABSTRACT

A method of storing, reading and erasing information in an alkali halide crystal containing F centers and having semi-transparent electrical layers on opposite surfaces. Binary information is stored or erased by alternately applying a high D.C. electric field across the crystal while simultaneously illuminating a small area of the crystal with F light. Light exposure of the crystal area with a field and without a field may be equated to writing (or erasing and rewriting) the binary digits zero and one, respectively. Reading the stored information is similar except that the D.C. field is switched on electronically after sensing the digit zero so as to erase any absorption produced by the reading light. This system is entirely fatigue-free and is operable at a single temperature while using one laser beam, instead of two, for writing, erasing and reading in an effectively nondestructive manner.

3 Claims, No Drawings

METHOD OF INFORMATION STORAGE USING ELECTRO-OPTIC PROPERTIES OF COLOR CENTERS IN ALKALI HALIDE CRYSTALS

STATEMENT OF GOVERNMENT INTEREST

The invention described herein may be manufactured and used by or for The Government of the United States of America for governmental purposes without the payment of any royalties thereon or therefor.

BACKGROUND OF THE INVENTION

1. Field of the Invention

The present invention relates to a system of information storage in data processing and, more particularly, to an electro-optical storage system using alkali halide crystals containing color centers.

2. Description of the Prior Art

In computers and related apparatus there exists a need for memory elements in which information can be stored temporarily, while remaining accessible for reading, and then readily erased or modified. Hitherto there have been devices in which the memory was achieved by the use of ferroelectric elements. However, with the remarkable increase in knowledge concerning the nature of point defects in the lattices of insulating materials, new information storage elements utilizing such materials have evolved.

In alkali halides, the simplest and most important point defects are the so-called F centers. These centers consist of an electron trapped at a negative-ion vacancy. They give rise to a prominent absorption band called the F band, which, depending on the crystal, peaks in or near the visible spectral region. Their usefulness for storage purposes arises from the fact that binary information can be stored or removed by optically creating or reversibly destroying the centers and thereby producing or bleaching the absorption band associated with these centers. Until now, however, attempts to use color centers have proven disappointing because the optical conversion is irreversible (leading to fatigue) or because the readout procedure has a destructive effect on the stored information. Another major disadvantage with the prior art systems has been the difficulty in guiding and focussing two light sources, e.g., laser beams, to extremely small segments of the crystal element instead of one source as provided in the present system.

SUMMARY OF THE INVENTION

According to the present invention, there is provided a novel technique for storing, reading and erasing information in an alkali halide crystal containing F centers which obviates the difficulties encountered with prior art devices. It consists of utilizing a high D.C. electric field in conjunction with F band light to create and destroy F centers in crystal storage elements held at low temperatures. The method is unique in that it is the first time a single light wavelength can be used with a photochromic material for writing, erasing and reading operations. Rapid switching of a general D.C. electric field to the entire crystal element is easily achieved. In addition, the F center conversion and field switching is highly efficient, entirely reversible and non-destructive during readout.

OBJECTS

It is, therefore, an object of the present invention to provide a novel electro-optic storage system utilizing an alkali halide crystal containing color centers.

It is a further object of the present invention to provide a unique method for storing, reading, and erasing information utilizing an alkali halide crystal containing F centers.

It is a still further object of the present invention to provide a method for writing, reading and erasing information in a photochromic material whereby only a single light source is needed.

Another object of the present invention is that the reading, writing and erasing operations can be performed while the storage element is maintained at a single nominal operating temperature.

Still other objects, features and attendant advantages of the present invention will become apparent to those skilled in the art from a reading of the following detailed description of a preferred embodiment.

DESCRIPTION OF THE PREFERRED EMBODIMENT

This invention is based on certain physical phenomena which occur in ionic crystals through the interaction of the crystal material with electrical fields. The effect described is based on the use of the so-called F centers which, if present in a crystal, constitute a large concentration of atomically dispersed negative ion vacancies each containing a single trapped electron. The crystal is electrically neutral but characterized by intense coloration and electrical properties which are markedly different from the usual uncolored crystal.

F centers are introduced into an ionic alkali halide crystal in various ways. An especially simple way is to heat the crystal in the vapor of the alkali metal at high temperatures. Other ways are to expose the crystal to ionizing irradiation such as X-rays or high-energy electrons.

In alkali halide crystals, e.g., KCl, a new color center may be made from the F center at temperatures near −100° C. If light is absorbed by the F center, its electron is excited to the conduction band by a combination of light and thermal excitation. The free electron then drifts through the crystal lattice and may be captured by another F center — producing a center containing two electrons. This defect, consisting of two electrons at a halide ion vacancy, is called an F′ center. The extra electron is only weakly bound, so that the F′ center is bleached rather easily with light in its absorption even at very low temperatures. At temperatures near 77° K, F band light alone does not substantially excite the F center electron into the conduction band. However, if both F band light and an electric field are applied simultaneously, a large majority of the F centers are converted to F′ centers as previously described. It should also be noted that the D.C. electric field alone will not excite the F center electrons into the conduction band, i.e., at low temperatures, the combination of both F band light and electric field are necessary. F′ centers have a broad, weak absorption which partially overlaps the F absorption band. When a crystal containing F′ centers is exposed to this same F band light at temperatures near 77° K but without an electric field, the F′ centers rapidly bleach converting them back to F centers.

An information storage element suitable for use with this invention consists of a thin alkali halide crystal containing F centers and having electrodes on opposite surfaces, such as evaporated semi-transparent electrical layers, known in the art. As with any photochromic material relying on atomically dispersed color centers, such a crystal device has a potential storage capacity in excess of about $10^8$ bits/cm$^2$. Furthermore as with most alkali halide crystals, the elements are readily and inexpensively prepared. A crystal which has been most extensively investigated and is suitable for this application is potassium chloride having an F center absorption band peaking near 540 nm when measured at 77° K.

For computer operation the relative presence or absence of F centers read without a field may be equated to the binary digits one or zero. Information may be written or erased by exposing a small selected portion of the crystal element to F band light, with or without a field, depending on the digit. For example, the binary digit one would require no field. To write-in or erase the binary digit zero, the same procedure is followed except that a high D.C. electric field covering the entire surface of the crystal is applied simultaneously with application of the F band light. (Note that, as previously discussed, the application of a high D.C. field alone will not produce any optical changes). This will cause the appearance of F′ centers, in place of the original F centers, with their characteristic broad absorption band. The read operation is similar to the write and erase operations and is accomplished by interrogating specified portions of the crystal element containing stored information again with F band light. The relative absence or presence of F centers (or conversely, the absence or presence of F′ centers) may be detected by known prior art techniques such as measuring the light transmitted or detecting emitted radiation caused by excitation of the F center electrons, e.g., the F center emission in KCl peaks at around 1010 m$\mu$. To prevent the erasure of the binary digit zero following interrogation, the D.C. field is turned on while the F light is still at the bit, thereby restoring any bleached F′ centers (or conversely, bleaching F centers produced by the read operation).

Since F centers and their conversion to F′ centers occurs not only in practically all alkali halides but also other materials such as alkaline earth halides, the storage element can be fabricated from a wide range of materials for which F to F′ center conversions are observed. The effective temperature chosen for convenience for KCl was 77° K. However, any temperature up to roughly 100° K, the temperature at which thermal ionization of optically excited F centers occurs, may be utilized. Similarly, for other materials any temperature below which F′ formation occurs with light alone may be used. The field strength applied to the crystals should be high enough so that a maximum F to F′ center conversion occurs but still remain below the electrical breakdown strength of the material. For KCl, a usable range is from 2 to $4 \times 10^5$ volts/cm.

A storage element can also be fabricated using materials of the aforementioned types employing conversions between other color centers. For example, one alternative is the use of $F_A$ to $F_A'$ centers in KCl using again a high D.C. field and light in the $F_A$ band, (The $F_A$ center is an F center which happens to lie next to an alkali impurity in an alkali halide).

Obviously many modifications and variations of the present invention are possible in light of the above teachings. One such variation might be the use of the element for analogue-type computer storage instead of the digital-type which employs only the two binary digits. For the former, one need only vary the amount of F to F′ conversion to achieve a quasi-continuous range of digits. This continuous range may be achieved by varying either the duration of the F light, the strength of the D.C. field or the operating temperature. It is therefore to be understood that within the scope of the appended claims the invention may be practiced otherwise than as specifically described.

What is claimed and desired to be secured by Letters Patent of the United States is:

1. In a method of sequentially storing and erasing information in a thin alkali halide crystal containing F centers maintained at temperatures below which F′ center formation occurs and having semi-transparent, electrically conducting layers on opposite surfaces thereof for application of a D.C. electric field comprising:

selectively exposing a first part of said crystal with F band light, said part representing a first bit of stored information; and, selectively exposing a second part of said crystal with F band light while simultaneously applying a D.C. electric field across opposite surfaces of said crystal to cause the formation of F′ centers representing a second bit of stored information.

2. A method as in claim 1 including the step of reading stored information by interrogating said selected parts with F band light to determine the presence of F centers and including the switching on of said D.C. electric field when interrogating said second crystal part.

3. A method as in claim 1 wherein said crystal comprises potassium chloride.

* * * * *